(12) United States Patent
Sasaki et al.

(10) Patent No.: US 7,249,893 B2
(45) Date of Patent: Jul. 31, 2007

(54) ROLLING BEARING AND ROD END BEARING

(75) Inventors: Gen Sasaki, Kitasaku-Gun (JP); Shinichi Akao, Kitasaku-Gun (JP); Makoto Fujino, Kitasaku-Gun (JP)

(73) Assignee: Minebea Co. Ltd, Nagano (JP)

( * ) Notice: Subject to any disclaimer, the term of this patent is extended or adjusted under 35 U.S.C. 154(b) by 95 days.

(21) Appl. No.: 10/371,888

(22) Filed: Feb. 21, 2003

(65) Prior Publication Data
US 2003/0161563 A1    Aug. 28, 2003

(30) Foreign Application Priority Data
Feb. 26, 2002    (JP) .............................. 2002-050320

(51) Int. Cl.
*F16C 23/08*    (2006.01)

(52) U.S. Cl. .................. 384/495; 384/497; 403/122; 403/127; 403/130; 403/133

(58) Field of Classification Search .................. 403/76, 403/122, 125, 127, 130, 131, 133, 135, 140; 384/495–498, 558
See application file for complete search history.

(56) References Cited

U.S. PATENT DOCUMENTS

| | | | | |
|---|---|---|---|---|
| 1,983,655 | A | * | 12/1934 | Bowman et al. ............ 403/127 |
| 2,632,677 | A | * | 3/1953 | Potter .......................... 394/498 |
| 2,853,326 | A | * | 9/1958 | Booth .......................... 403/127 |
| 2,878,047 | A | * | 3/1959 | Booth .......................... 403/130 |
| 4,124,257 | A | * | 11/1978 | Derner et al. ............... 384/498 |
| 4,129,343 | A | * | 12/1978 | Janssen ....................... 384/558 |
| 4,666,329 | A | * | 5/1987 | Hugelmann ................. 403/127 |
| 5,468,074 | A | * | 11/1995 | Godec et al. ............... 384/495 |

FOREIGN PATENT DOCUMENTS

| | | | |
|---|---|---|---|
| DE | 37 01 397 | * | 7/1988 |
| EP | 1 338 810 A1 | | 2/2003 |

* cited by examiner

*Primary Examiner*—William C. Joyce
(74) *Attorney, Agent, or Firm*—Joel E. Lutzker, Esq.; John C. Garces, Esq.; Schulte Roth & Zabel LLP

(57) ABSTRACT

A rolling bearing and a rod end bearing are provided with a tilt mechanism and a rotary mechanism that are mutually independent. The tilt mechanism has a non-lubricated type spherical sliding bearing structure. The rotary mechanism has a rolling bearing structure which may or may not be sealed. By means of the non-lubricated type spherical sliding bearing structure, a tilt of the shaft center is made possible, and by means of a sealed rolling bearing structure, problems such as a lubrication oil leak are avoided, and carrying out high speed rotation and continuous rotation become possible. Because the sealed rolling bearing structure of the rotary mechanism does not call for a shaft center tilt function at all, the material of the seal can be chosen such that it emphasizes sliding resistance and high durability.

4 Claims, 7 Drawing Sheets

(a)

(b)

(a)

(b)

(a)

(b)

(a)

(b)

ROLLING BEARING AND ROD END BEARING

CROSS-REFERENCE TO RELATED APPLICATIONS

This application claims all rights of priority to Japanese Patent Application No. 2002-050320 filed on Feb. 26, 2002, (pending).

BACKGROUND OF THE INVENTION

The present invention relates to the improvement of bearings such as rolling bearings and rod end bearings, having a shaft center tilt mechanism and rotary mechanism that are mutually independent.

Up to now rod end bearings have, generally, been used as bearings for aircraft use. The conventional rod end bearing 1 shown in FIG. 6 is provided with rolling elements 2 (the illustrated example is a roller), and the inner race 6 which is supported by the main body 4 and is capable of being rotated. Furthermore, in order to prevent the leaking of lubrication oil filled in the inner part of the bearing, the bearing is sealed with a seal 3. Additionally, in the illustrated example, a shield 5 is also fixed to the outer race 4a integrated with the main body 4. At the time of the rotation and at the time of the tilting of the inner race 6 with respect to the outer race 4a, the seal 3 and shield 5 have a sliding relationship. Here, the sealing between the seal 3 and the shield 5 is ensured, mainly, by means of the adhesive strength due to the elasticity of the seal 3.

Another bearing, commonly used in the industry, is the self-aligning type bearing 7 which has a shaft center tilt mechanism, as shown in FIG. 7. This self-aligning type bearing 7 uses a rolling element 8 (the illustrated example is a ball) as shown in FIG. 7, and has a sealed rolling bearing structure that provides a shield 11 and seal 12 between the inner race 9 and the outer race 10 in order to prevent leaking of the lubrication oil filled in the inner part of the bearing. In the example of FIG. 7, the shield 11 fixed to the outer race 10 has the function of holding the seal 12. The sealed relationship between the spherical surface 9a of the inner race 9 and the seal 12 is mainly ensured by the adhesive strength due to the elasticity of the seal 12. Furthermore, bearings without the seal structure are also widely used in both rod end bearings and self-aligning type bearings.

The above-mentioned bearings each have a shaft center tilt mechanism, which is a mechanism that changes the relative angle of the inner race shaft center and the outer race shaft center. For this reason, seals 3 and 12 in FIGS. 6 and 7 respectively, are mainly selected for the purpose of obtaining a highly sealed nature in response to the changes of the tilt angles of the shaft centers. This selection emphasized sliding resistance and high durability, unlike seals of ordinary radial ball bearings. Use of the above-mentioned former rod end bearings 1 and self-aligning type bearings 7 is complicated because the seal function necessary in high speed, long duration and continuous rotation is not provided and, under conditions in which regular maintenance could not be done, the danger of a lubrication oil leak is always possible.

Furthermore, as for the above-mentioned former rod end bearings 1 and self-aligning type bearings 7, regardless of the tilt angle of the shaft center, in order to heighten the sealing property of seals 3 and 12, it is also necessary for the sliding area to become larger, and, at the time of high speed rotation, this large sliding area causes greater noise, friction and "wear and tear".

On the other hand, in the case of rod end bearings without the seal structure, problems attributable to seals, of course, did not arise, but sufficient lubricity could not be obtained, and making a shaft center tilt mechanism with a compatible high speed rotation mechanism had been regarded as difficult.

In order to make the tilt and rotary mechanisms compatible, the bearing structure became extremely complex and an increase in cost, and the difficulty of maintaining rod end bearings and self-aligning type bearings could not be avoided.

SUMMARY OF THE INVENTION

The present invention was conceived to solve the problems of the prior art described above and its object is to provide improved bearings, such as rolling bearings and rod end bearings, having a shaft center tilt mechanism and rotary mechanism that are mutually independent.

A rolling bearing and a rod end bearing are provided with a tilt mechanism and a rotary mechanism that are mutually independent. The tilt mechanism has a non-lubricated type spherical sliding bearing structure. The rotary mechanism has a rolling bearing structure which may or may not be sealed. By means of the non-lubricated type spherical sliding bearing structure, a tilt of the shaft center is made possible, and by means of a sealed rolling bearing structure, problems such as a lubrication oil leak are avoided, and carrying out high speed rotation and continuous rotation become possible. Because the sealed rolling bearing structure of the rotary mechanism does not call for a shaft center tilt function at all, the material of the seal can be chosen such that it emphasizes sliding resistance and high durability.

According to the present invention, tilting of the shaft center is possible without producing the problems of a lubrication oil leak, and high speed and continuous rotation is possible even in the tilted state.

The above advantages and features are of representative embodiments only. It should be understood that they are not to be considered limitations on the invention as defined by the claims. Additional features and advantages of the invention will become apparent in the following description and from the claims.

BRIEF DESCRIPTION OF THE DRAWINGS

A full understanding of the invention can be gained from the following description of the preferred embodiments when read in conjunction with the accompanying drawings in which.

DETAILED DESCRIPTION

Figure 1:
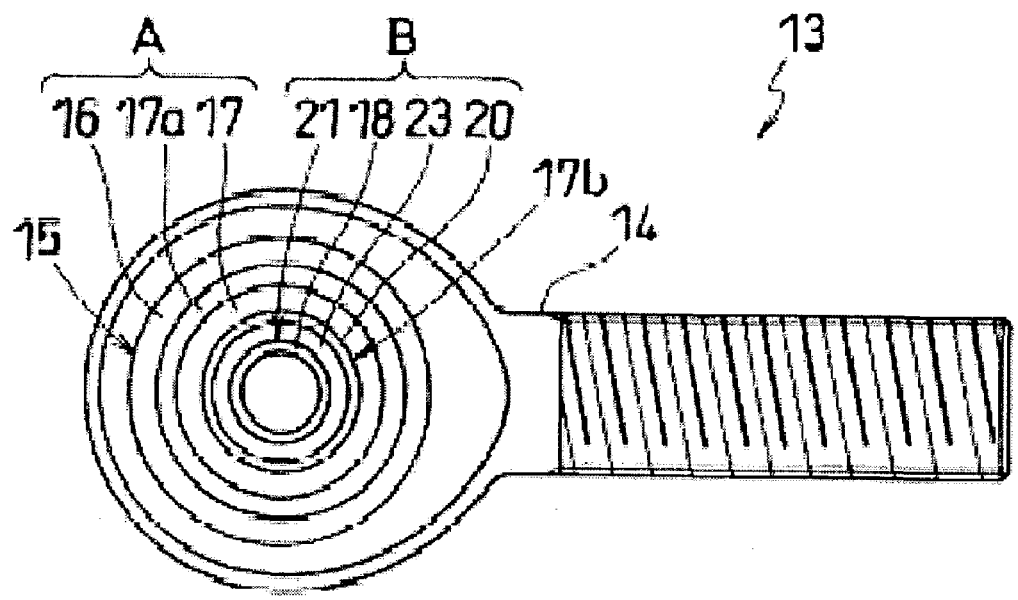
FIG. 1(a) is a top surface view of the rod end bearing concerned in the mode for carrying out the present invention.
FIG. 1(b) is a partial cross-sectional view of the rod end bearing embodying the mode for carrying out the present invention.
Figure 1:
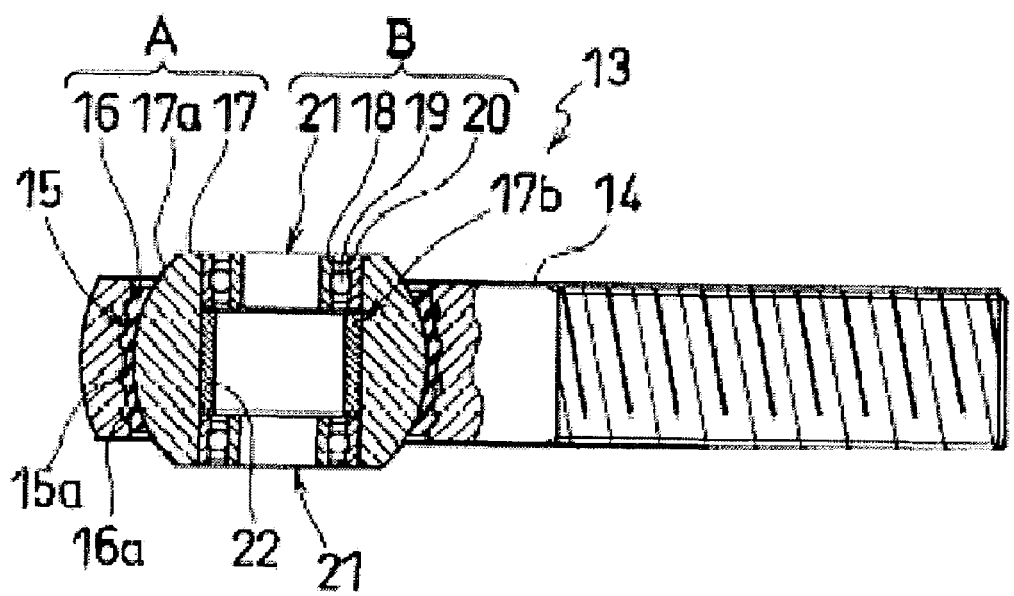

This invention solves the problems of prior art by providing improved bearings, such as rolling bearings and rod end bearings, having a shaft center tilt mechanism and rotary mechanism that are mutually independent.

In accordance with the first embodiment of the present invention, FIG. 1(a) shows the top surface view and FIG. 1(b) shows a partial cross-sectional view of the rod end bearing 13. The rod end bearing 13 is provided with a tilt mechanism A and a rotary mechanism B that are mutually independent.

As shown in FIGS. 1(a) and 1(b), the tilt mechanism A is pressed in or integrally formed in the spherical-shaped mounting hole 15 provided in the main body 14, and is constituted by a self-lubricating sliding member 16 which is a resin formed article and a spherical part 17 and which is able to slide in the self-lubricating sliding member 16. Furthermore, a concave part 15a is provided in the mounting hole 15, and by the protruding part 16a of the self-lubricating sliding member 16 being mated in the concave part 15a, the fixing of the self-lubricating sliding member 16 with respect to the mounting hole 15 is implemented. High performance engineering plastic material and the like such as a resin containing fluoride and a resin containing nylon can be used as material of the self-lubricating sliding member. Furthermore, the main body 14 and spherical part 17 can be made of carbon steel and stainless steel and the like. And, since the supply of lubricating oil is not necessary on the spherical surface 17a of the spherical part 17, the tilt mechanism A is one that has a non-lubricated type spherical sliding bearing structure.

A sealed radial ball bearing 21 having an inner race 18, ball 19, and outer race 20 is pushed into the through hole (inner diameter part of the spherical surface) formed in the spherical part 17 thus constituting a rotary mechanism B. The rotary mechanism B is the rotary mechanism having a sealed rolling bearing structure. In the illustrated rod end bearing 13, two sealed radial ball bearings 21 are used, and a spacer 22 is placed between the respective outer races 20. Thus, the positioning between the two sealed radial ball bearings 21 and imparting pressure are made possible. In an ordinary sealed radial ball bearing a two seal structure or a single seal structure is possible as demonstrated by seal 23 of the sealed radial ball bearing 21.

Figure 2:
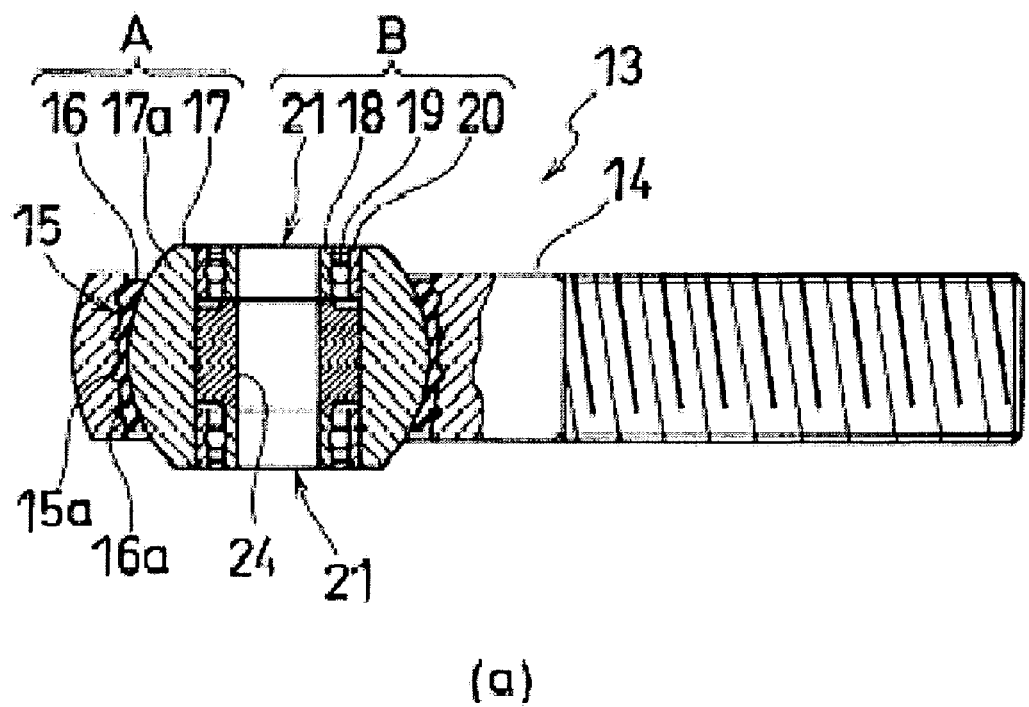
FIGS. 2(a) and 2(b) are partial cross-sectional views showing examples of the application of the rod end bearing shown in FIGS. 1(a) and (b).
Figure 2:
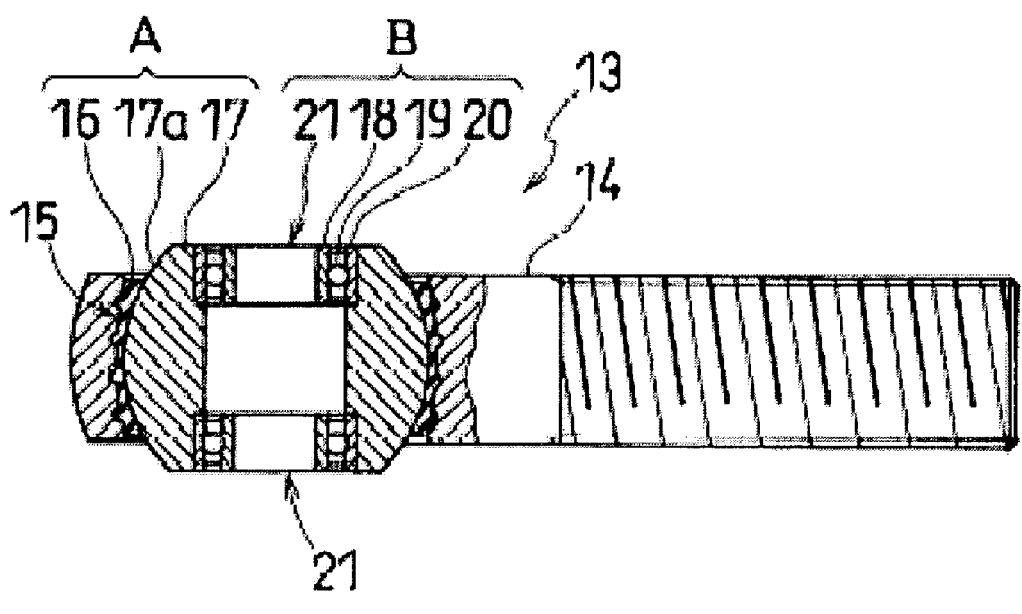

FIG. 2(a) shows an application example of the rod end bearing 13 shown in FIG. 1. In the example of FIG. 2(a), the spacer 22, provided between the outer race 20 of the two sealed radial ball bearings 21 shown in FIG. 1(b), is substituted by the spacer 24 provided between the inner race 18.

Furthermore, in FIG. 2(b) an example is shown in which the positioning of each radial ball bearing 21 is carried out by providing a difference in levels at the through hole 17b of the spherical part 17, without placing a spacer between two sealed radial ball bearings 21, and using this difference in levels as a mount. In another embodiment, the number of sealed radial ball bearings 21 may be increased to more than one, making it possible to use radial ball bearings of a double row type.

In accordance with another embodiment of the present invention, a rolling bearing 25 having a tilt mechanism is provided. FIG. 3(a) shows the top surface view of the rolling bearing 25 and FIG. 3(b) shows a cross-sectional view of the same. Just like the rod end bearing 13, the rolling bearing 25 is provided with a tilt mechanism A and a rotary mechanism B that are mutually independent.

The tilt mechanism A is pushed into or integrally formed in the spherical-shaped hole of the outer ring 26, and constituted by a self-lubricating sliding member 27 that is a resin formed article, and a spherical part 28 that is held able to slide in the self-lubricating sliding member 27. A concave part 26 is provided in the spherical shaped hole of the outer ring 26. The self-lubricating sliding member 27 is secured with respect to the spherical shaped hole of the outer ring 26 accomplished by the protruding part 27a of the self-lubricating sliding member 27 being mated in the concave part 26.

A sealed radial ball bearing 32 having an inner race 29, ball 30, and outer race 31 is pushed in the through hole 28b formed in the spherical part 28 thus constituting a rotary mechanism B. Specifically, the rotary mechanism B is the one that has a sealed rolling bearing structure. Furthermore, in the illustrated rolling bearing 25, two sealed radial ball bearings 32 are used, and a spacer 33 is placed between the respective outer races 31. Thus, the positioning between the two sealed radial ball bearings 32 and imparting pressure is made possible. In an ordinary sealed radial ball bearing, a two seal structure or a single seal structure is possible as demonstrated by seal 34 of the sealed radial ball bearing 32.

Figure 3:
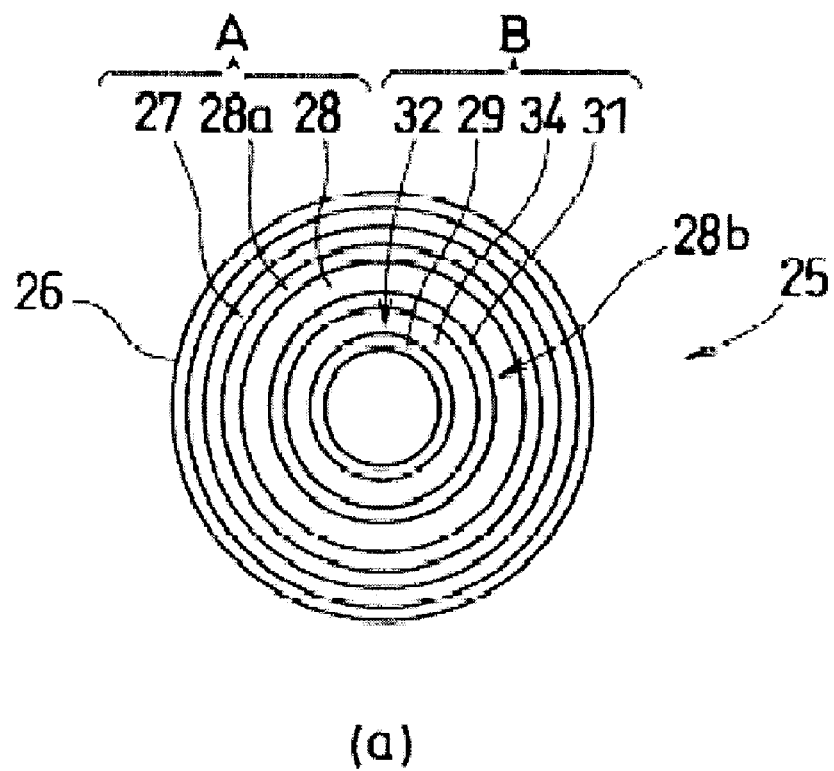
FIG. 3(a) is a top surface view of a rolling bearing having a tilt mechanism embodying the mode for carrying out the present invention.
FIG. 3(b) is a cross-sectional view of a rolling bearing having a tilt mechanism embodying the mode for carrying out the present invention.
Figure 3:
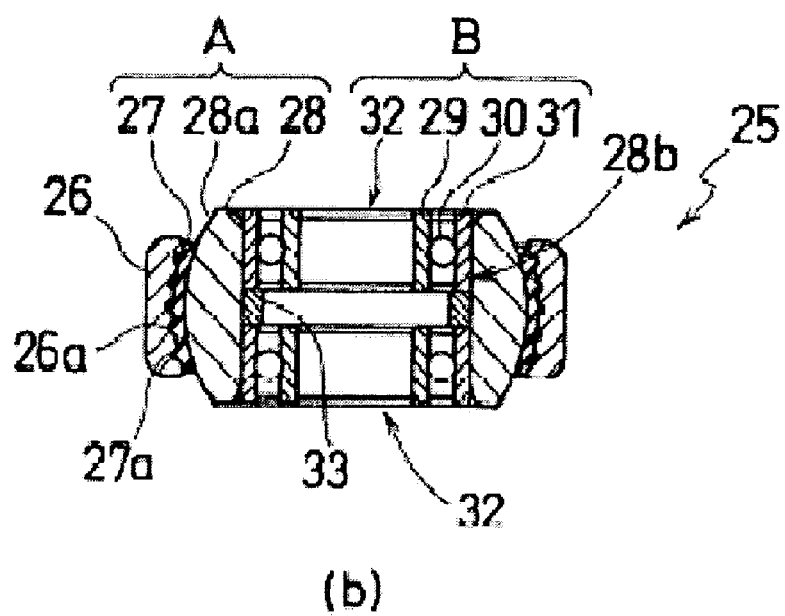
Figure 4:
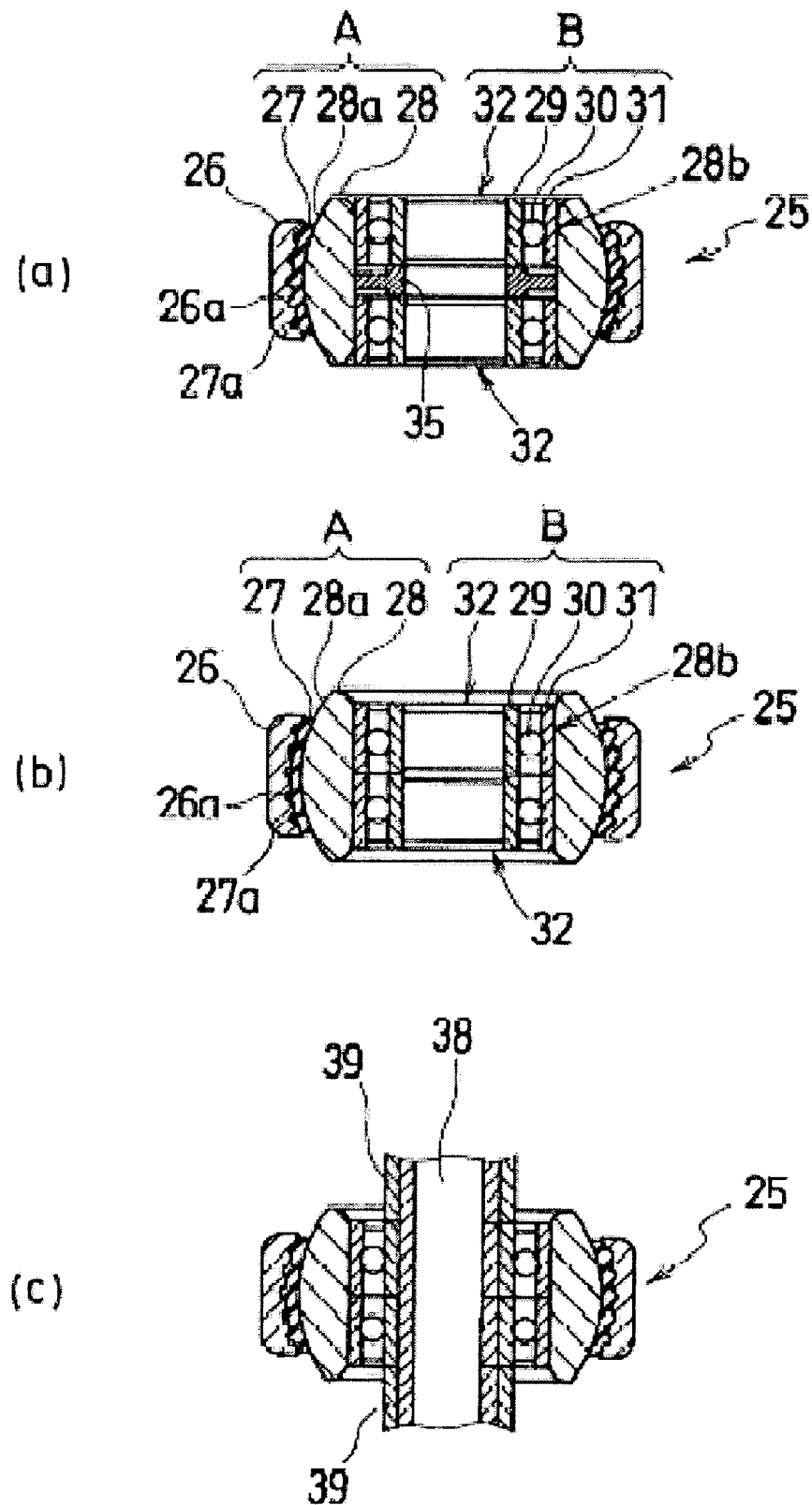
FIGS. 4(a)-4(c) are cross-sectional views showing an example of the application of a rolling bearing having a tilt mechanism shown in FIGS. 3(a) and (b).

FIG. 4(a) shows an application example of the rolling bearing 25 shown in FIG. 3. In the application shown in FIG. 4(a), spacer 33, provided between the outer race 31, is substituted by the spacer 35, provided between the inner race 29 of the two sealed radial ball bearings 32 shown in FIG. 3(b). Additionally, FIG. 4(b) demonstrates an example where no spacers are placed between the two sealed radial ball bearings 32, causing them to be directly adhered.

FIG. 4(c) sets forth an example in which the radial bearings of FIG. 4(b) are inserted and fixed in the ring shaped bushing 38, such that from both end parts of both inner races 29, the inner race 29 is held down in the axial direction, and a ring shaped collar 39 is inserted and fixed on the external part of the ring shaped bushing 38.

Figure 5:
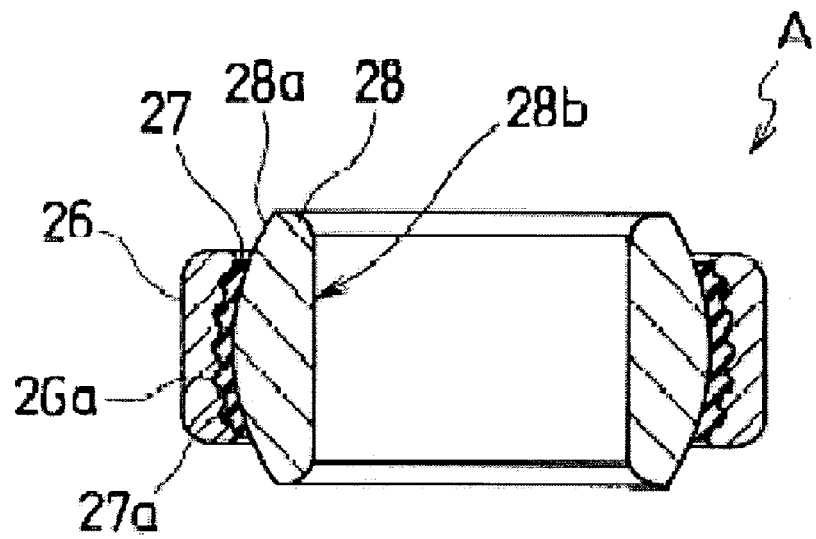
FIGS. 5(a) and 5(b) are cross-sectional views showing an example of the application of the tilt mechanism of a rolling bearing having a tilt mechanism shown in FIGS. 3(a) and 3(b).
Figure 5:
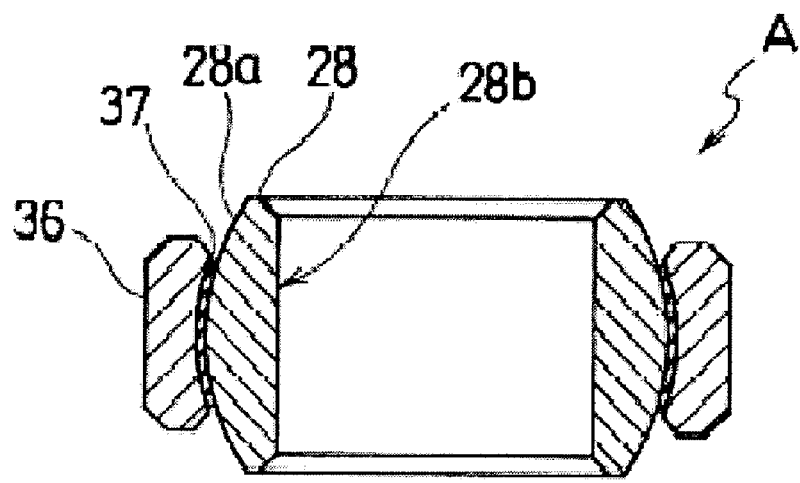
Figure 6A:
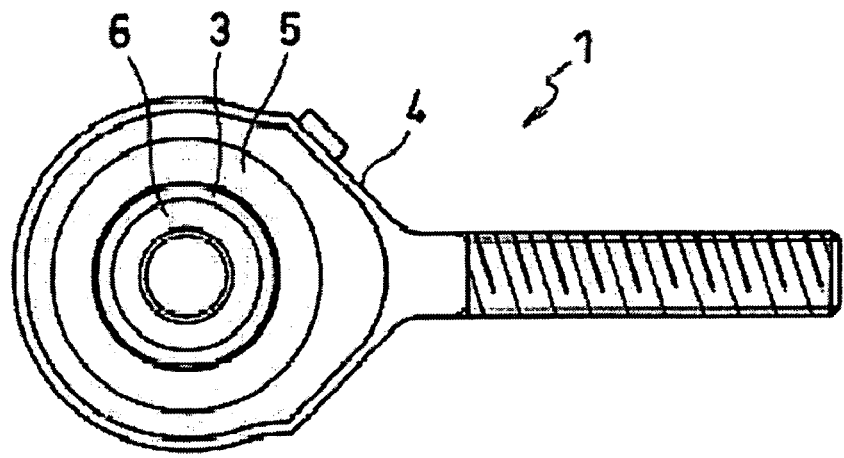
FIG. 6(a) is a top surface view of a conventional rod end bearing.
Figure 6B:
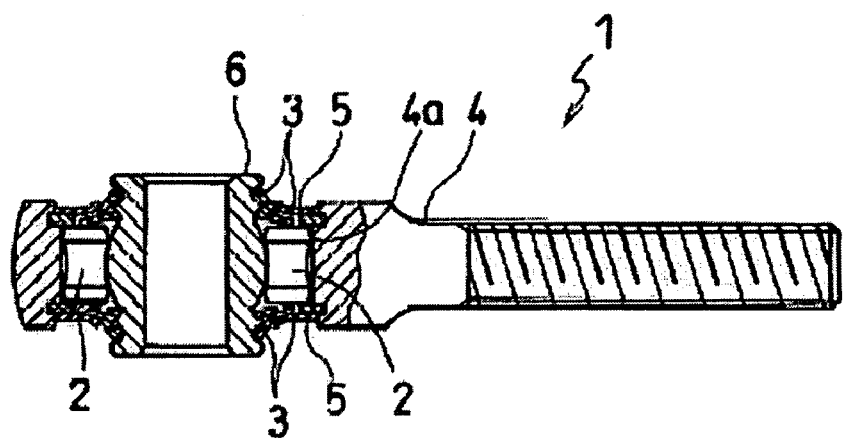
FIG. 6(b) is a partial cross-sectional view of a conventional rod end bearing.
Figure 7:
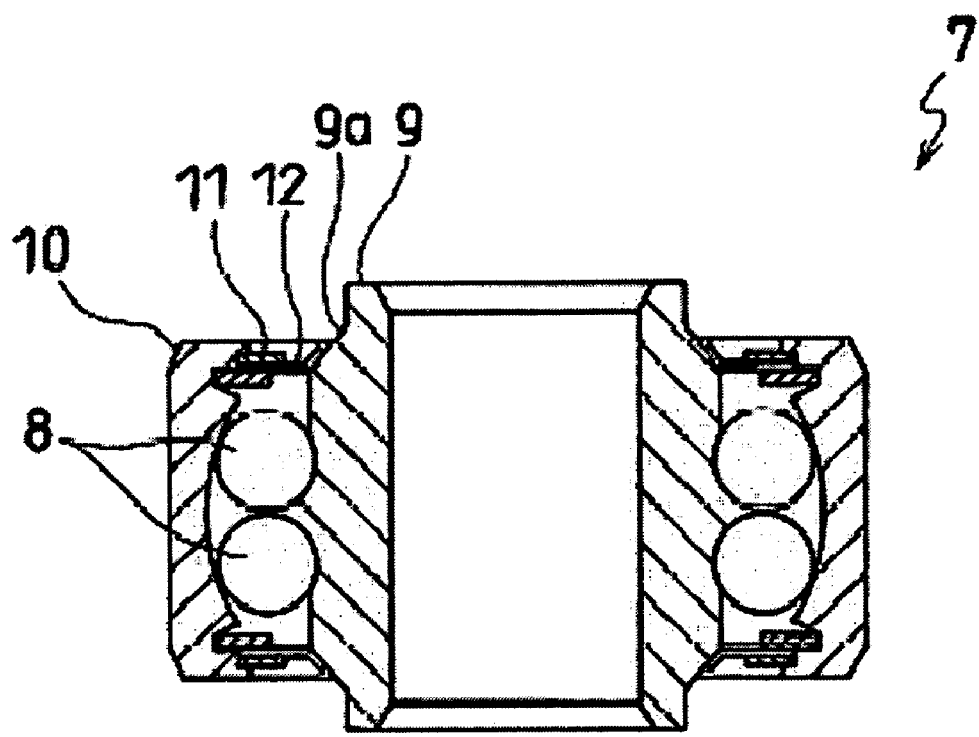
FIG. 7 is a cross-sectional view of a conventional self-aligning type bearing.

FIGS. 5(a) and 5(b) show application examples of the tilt mechanism A of the rolling bearing 25 shown in FIG. 3. As shown in FIG. 5(a), by changing to a structure that uses the resin formed article of a separate body from the outer ring 26 as a self-lubricating sliding member 27, and, as shown in FIG. 5(b), by securing the self-lubricating sliding member 37 to the wall surface of the spherical shaped hole of the outer ring 36, the outer race can also be constituted. The tilt mechanism A of the rolling bearing 25 has the structure of a non-lubricated type sliding bearing. Furthermore, the tilt mechanism A of the above-mentioned rod end bearing 13 can also use the self-lubricating sliding member 37 of FIG. 5(b).

The mode for carrying out the present invention can be described as follows. First, the rod end bearing 13 and the rolling bearing 25, involved in the mode for carrying out the present invention, each is provided with a tilt mechanism A and a rotary mechanism B that are mutually independent, such that, in the tilt mechanism A, a structure suited to tilt action has been provided, and, in the rotary mechanism B, a structure suited to high speed and continuous rotation has been provided. Accordingly, for the rod end bearing 13 and the rolling bearing 25, tilting of the shaft center is possible without producing the problems of a lubrication oil leak and high speed and continuous rotation is possible even in the tilted state.

Furthermore, the tilt mechanism A has non-lubricated type spherical sliding bearing structure (16, 17, 17a, 27, 28, 28a), and the rotary mechanism B has a sealed rolling bearing structure (18, 19, 20, 21, 23, 29, 30, 31, 32, 34). Therefore, due to the above-mentioned non-lubricated type spherical sliding bearing structure, tilting of the shaft center is possible, and due to the above-mentioned sealed rolling bearing structure, problems such as a lubrication oil leak are avoided. Problems with respect to the ease of installation due to the complex seal mechanism in the conventional structure, and problems of reliability, cost increase and the like, are also eliminated. Thus, carrying out high speed and continuous rotation of a high reliability becomes possible.

As for the sealed rolling bearing structure of rotary mechanism B of the rod end bearing 13 and the rolling bearing 25, where the tilt function of the shaft center is not called for, the material of the seals 23 and 34 are chosen with an emphasis on sliding resistance and high durability. For this reason, the rod end bearing 13 and the rolling bearing 25 involved in the mode for carrying out the present invention are suitable for high speed, long and continuous rotation, and even under conditions where regular maintenance cannot be carried out, the danger of a lubrication oil leak can be avoided. Accordingly, it is possible to expand the range of use of the presently provided structure. For example, the provided structure can be implemented where a slight leak of lubrication oil and the occurrence of an odor and noise become problematic, such as in medical treatment instruments.

Because the sealed rolling bearing structure (18, 19, 20, 21, 23, 29, 30, 31, 32, 34) of the rod end bearing 13 and the rolling bearing 25 are located in the spherical inner diameter part of the spherical part 17, 28 of the non-lubricated type spherical sliding bearing, the sealed rolling bearing structure and the non-lubricated type spherical sliding bearing structure are formed in one unit. And since the sealed rolling bearing structure rotates within the spherical part 17, 28 that tilts, carrying out high speed and continuous rotation becomes possible even when the shaft center is tilted.

Although the illustration has been omitted, if the sealed rolling bearing structure of rotary mechanism B is changed to a rolling bearing structure without a seal, compatibility of the shaft center tilt mechanism with the high speed rotation mechanism remains possible without leading to a complicated bearing structure. Even in the case of a rod end bearing and self-aligning type bearing structure without a seal, making the shaft center tilt mechanism and high speed rotation mechanism compatible is no longer regarded as difficult, and avoiding high costs and high maintenance also becomes possible.

Other applications of this invention that are worth mentioning are the use of various rolling bearings such as the so-called needle type, roller type and linear bushing type in the rotary mechanism B and adding the shaft center tilt mechanism, while ensuring the functions of these rolling bearings, becomes possible.

Consequently, manufacturing of the bearings that, in accordance with the present invention, have a shaft center tilt mechanism such as rolling bearings and rod end bearings results in significant reduction in cost. Furthermore, use of self-aligning type bearings and rod end bearings that provide a seal enables the prevention of a lubrication oil leak as well as the improvement of low noise properties.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

The invention claimed is:

1. A rolling bearing comprising:
   a main body having a spherically-shaped mounting hole;
   a tilt mechanism positioned in the spherically-shaped mounting hole and having a self-lubricating sliding member and a spherical part having a through hole, the spherical part being freely slidable within the self-lubricating sliding member; and
   a rotary mechanism,
   wherein said tilt mechanism and said rotary mechanism are mutually independent;
   wherein said rotary mechanism comprises a first rolling bearing and a second rolling bearing,
   wherein each of the rolling bearing having an inner race and an outer race,
   wherein the outer races are pushed into the through hole, and
   wherein the spherically-shaped mounting hole includes a concave portion, the self-lubricating sliding member includes a protruding portion, and the self-lubricating sliding member is secured within the spherically-shaped mounting hole by mating of the concave portion and the protruding portion.

2. The rolling bearing according to claim 1 wherein said rotary mechanism has a sealed rolling bearing structure.

3. A rod end bearing comprising:
   a main body having a spherically-shaped mounting hole;
   a tilt mechanism positioned in the spherically-shaped mounting hole and having a self-lubricating sliding member and a spherical part having a through hole, the spherical part being freely slidable within the self-lubricating sliding member; and
   a rotary mechanism,
   wherein said tilt mechanism and said rotary mechanism are mutually independent;
   wherein said rotary mechanism comprises a first rolling bearing and a second rolling bearing,
   wherein each of the rolling bearing having an inner race and an outer race, wherein the outer races are pushed into the through hole, and wherein the spherically-shaped mounting hole includes a concave portion, the self-lubricating sliding member includes a protruding portion, and the self-lubricating sliding member is secured within the spherically-shaped mounting hole by mating of the concave portion and the protruding portion.

4. The rod end bearing according to claim 3 wherein said rotary mechanism has a sealed rolling bearing structure.

* * * * *